United States Patent [19]
Benson

[11] Patent Number: 5,577,717
[45] Date of Patent: Nov. 26, 1996

[54] JEWELER'S SAW VISE

[76] Inventor: Donald M. Benson, 3433 100th St., Grant, Mich. 49327

[21] Appl. No.: 452,891

[22] Filed: May 30, 1995

[51] Int. Cl.$^6$ ........................................................ B25B 1/00
[52] U.S. Cl. .......................... 269/87.2; 269/97; 269/239; 269/254 R; 269/902
[58] Field of Search ........................ 83/454, 762; 269/87, 269/87.1, 87.2, 87.3, 902, 254 R, 239, 97, 98, 275, 274

[56] References Cited

U.S. PATENT DOCUMENTS

| | | | |
|---|---|---|---|
| 952,473 | 3/1910 | Shaw et al. | 269/97 |
| 1,782,615 | 11/1930 | Hopwood | 269/254 R |
| 2,872,888 | 2/1959 | Kearney | 269/902 |
| 3,840,000 | 10/1974 | Bible | 269/87.2 |
| 4,733,842 | 3/1988 | Wilkerson | 269/239 |

*Primary Examiner*—Robert C. Watson
*Attorney, Agent, or Firm*—Dykema Gossett PLLC

[57] ABSTRACT

The jeweler's saw vise is for holding a relatively thin workpiece to permit a jeweler to use a saw to cut the workpiece firmly held by the vise. The vise comprises a pair of elongated upper and lower jaws having a front surface and a rear surface. The upper jaw is superimposed over the lower jaw which has a length longer than the upper jaw. The rear portion of the lower jaw forms a mounting tab for attaching the vise to a support. A biasing spring is interposed between the jaws to resiliently bias the jaws to a closed position. The jaws at the front surface are provided with a V-notch, with the widest part of the notch being located in the front surface to form an entrance to a V-notch provided in the jaws of the vise where the cutting of the material or workpiece occurs.

11 Claims, 2 Drawing Sheets

JEWELER'S SAW VISE

BACKGROUND OF THE INVENTION

This invention relates to a jeweler's saw vise which is used to hold relatively small and thin workpieces made from metal, plastic, wood, ivory, shell or other materials used in the craft or trade industries.

In the past a jeweler or craftsman would mount a bench block or bench pin in a standard jeweler's bench slot provided in a support or bench. The craftsman would hold the workpiece on the bench block with the fingers of one hand and would use the other hand to operate the saw in order to cut the workpiece. It was extremely difficult for the craftsman to hold the small workpiece on the bench block and in addition it was also difficult for the craftsman to cut the metal workpiece without turning or twisting same. Thus, inaccuracies in the cut could occur since the workpiece was not firmly held on the bench block. In addition, injuries could occur to the hand holding the workpiece as a result of the saw cutting the hand rather than the workpiece. Also as a result of the twisting & turning saw blades were more easily broken.

There has been a long felt need for a jeweler or other craftsman to have a vise which could hold relatively thin workpieces and which would permit the operator or craftsman to use a saw to cut or pierce the workpiece without causing any injury to the person and which would further permit the craftsman to open the vise to permit the workpiece to be turned in the vise for subsequent cutting.

SUMMARY OF THE PRESENT INVENTION

The jeweler's vise or saw vice of the present invention is used by clamping it on a table or desk with a conventional C-clamp or by placing it in a standard jeweler's bench slot. The workpiece is placed between the spring biased jaws of the vise which open easily once it is secured in place. The sawing of the workpiece is accomplished in a V-shaped area or notch provided in the jaws of the vise. The workpiece can easily be turned by opening the jaws and replacing the workpiece in different positions relative to the vice without removing the saw from the material of the workpiece being sawed.

Thus, it is a feature of the present invention to provide a jeweler's saw vise for holding a relatively thin workpiece to permit a jeweler to use a saw to cut the workpiece firmly held by the vise comprising a pair of elongated upper and lower jaws having front and rear end portions, with the front portion having a front surface, and with the upper jaw being superimposed over the lower jaw. With such a construction the jaws at the front end portion have a V-notch therein extending rearwardly from the front surface of the vise and with the widest part of the V-notch being located in the front surface to form an entrance for the workpiece to be inserted between the laws and spanning the notch provided in the jaws.

Another feature of the present invention is to provide a jeweler's saw vise of the aforementioned type wherein the lower jaw is longer than the upper jaw and forms at the rear end portion a mounting tab for attaching the vise to a support and a biasing spring is interposed between the jaws to resiliently bias the jaws to a closed position.

Still another feature of the present invention is to provide a jeweler's saw vise of the aforementioned type wherein the biasing spring has a pair of generally parallel spaced apart arms which are connected by a laterally extending bridge member, with the ends of the spring bent inwardly towards one another. With such a construction means are provided for mounting the arms of the spring to the lower jaw, with the bridge member engaging the upper surface of and extending across the tab and with the ends of the biasing spring extending across and being secured to the upper jaw.

Still another feature of the present invention is to provide a jeweler's saw vise of the aforementioned type wherein the opposing surfaces of the upper and lower jaws are provided with relatively thin resilient inserts which extend from the front surface of the jaws towards the rear and with, the resilient inserts each having a V-notch therein to match the V-notch provided in the jaws.

A further feature of the present invention is to provide a jeweler's saw vise of the aforementioned type wherein the upper jaw has a pair of longitudinal parallel edges and is provided with a finger grip along one of the longitudinal edges opposite the V-notch to permit the jeweler to separate the jaws to insert a workpiece therein to occupy the V-notch or to adjust the position of the workpiece held by the jaws of the vise.

A still further feature of the present invention is to provide a jeweler's saw vise of the aforementioned type wherein a pair of alignment pins are provided between the jaws to allow the jaws to self adjust to various thicknesses of the workpiece.

Another feature of the present invention is to provide a jeweler's saw vise of the aforementioned type wherein the upper and lower jaws are made from wood, the resilient inserts are made from rubber and the spring is made from steel.

Still another feature of the present invention is to provide a jeweler's saw vise of the aforementioned type wherein the mounting tab is of generally rectangular configuration, with the remaining portion of the lower jaw having the lower surface thereof tapered, with the thinnest part being at the front surface of the lower jaw and the thickest part being adjacent the rear end portion of the lower jaw at the place where the mounting tab is formed.

Still another feature of the present invention is to provide a jeweler's saw vise of the aforementioned type which has a pair of quick release and self adjusting jaws designed to speed the work along with ease.

Finally, it is a feature of the present invention to provide a jeweler's saw vise which is simple in construction, efficient in operation and is economical to manufacture.

DETAILED DESCRIPTION OF A PREFERRED EMBODIMENT

The jeweler's saw vise of the present invention is a spring pressure vise which is used to hold relatively small and thin workpieces made from metal, plastic, wood, ivory, shell or other materials used in the craft or trade industries.

Figure 1:
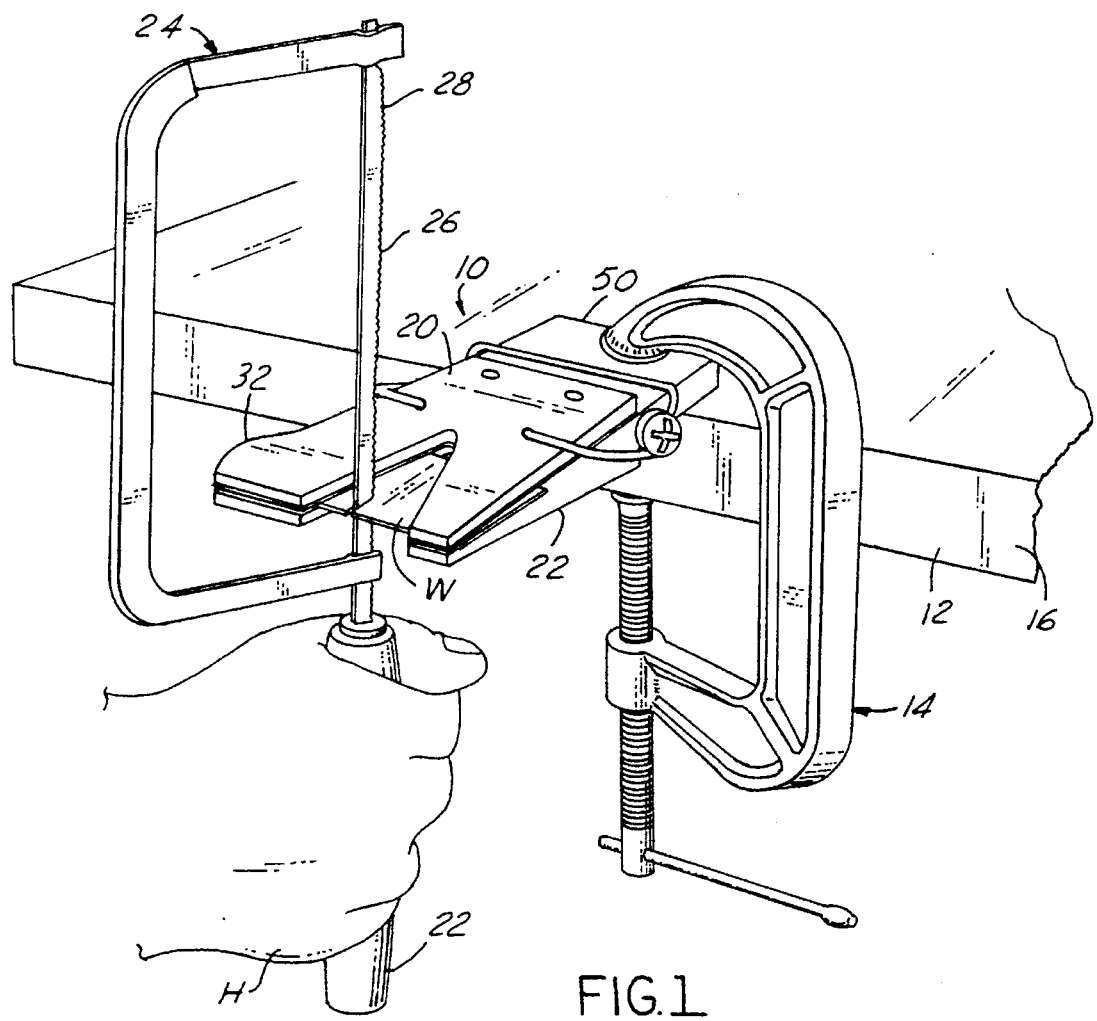
FIG. 1 is a prospective view showing the jeweler's saw vise mounted on a support by a C-clamp, with the jaws holding a workpiece and with a jeweler or craftsman cutting the workpiece firmly held in the V-notch by the jaws of the vise.

Referring now to the drawings, FIG. 1 illustrates the jeweler's saw vise 10 mounted on a jeweler's bench, table or other support 12 by a conventional C-clamp 14. The vise 10 is held in a horizontal position on the support 12 and extends in a direction outwardly from the front surface 16 of the bench 12 as shown. The vise 10 has an upper jaw 20 and a lower jaw 22. The upper jaw 20 is of a length less than the length of the lower jaw 22. The upper jaw 20 is superimposed over the lower jaw 22. FIG. 1 shows a craftsman's hand H holding the handle 22 of a coping saw 24 having a blade 26 with a plurality of teeth 28. The craftsman moves the saw 24 vertically in order to make the necessary cut or cuts in the workpiece W.

The upper jaw 20 is of generally rectangular configuration (in plan) and includes a pair of longitudinal generally parallel edges 30. In order to accommodate a person using his or her right hand to operate the saw 24, the left longitudinal edge 30 is provided with an enlarged outwardly extending finger grip 32 so tht a person may take hold of the finger grip 32 in order to separate the jaws 20 and 22 to permit insertion of the workpiece W into the vise 10 or the removal of the workpiece W from the vise 10. The upper jaw 20 is made from wood or aluminum and has a uniform thickness throughout its length.

Figure 5:
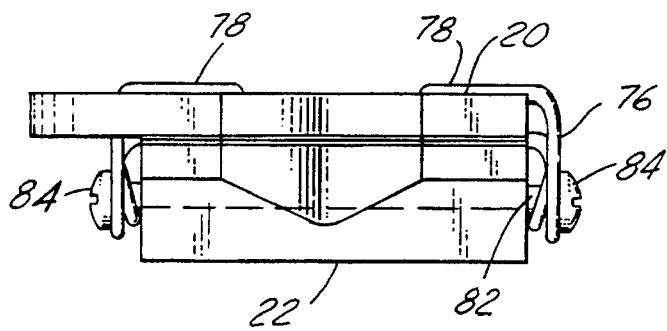
FIG. 5 is a front elevational view of the jeweler's saw vise taken along the line 5—5 of FIG. 2.

The lower jaw 22 is longer in length than the upper jaw 20. It is also made from wood or aluminum and is also of generally rectangular cross section when viewed from the top as in FIG. 2 and from the front as in FIG. 5.

Figure 2:
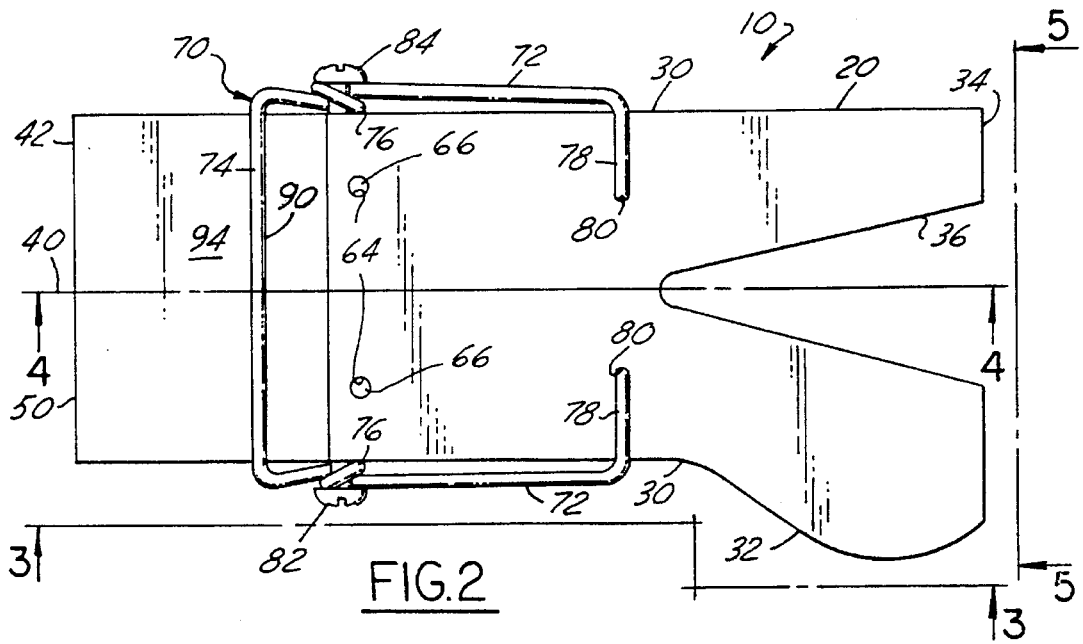
FIG. 2 is a plan view of the jeweler's saw vise.

The top jaw 20 is superimposed over the lower jaw 22 to form the vise 10. The front surface 34 of the vise 10 is provided with a V-notch 36 which has the widest portion thereof at the entrance or front surface 34 to form an entrance to the vise 10. The notch 36 is located on the longitudinal centerline 40 of the vise (FIG. 2). The notch 36 has a depth extending approximately one-third the lenth of the vise 10 and extends towards the rear surface 42 of the vise. The notch 36 provides the cutting zone for the workpiece W.

The lower jaw 22 is also made from wood, is of generally rectangular configuration when viewed from the top as in FIG. 2. It includes at the rear portion of the jaw 22 a mounting tab 50 which is of generally rectangular configuration. Tab 50 extends rearwardly from the vertical surface 52 of the jaw 22. Surface 52 abuts against the front surface 16 of the bench or support 12 as best shown in FIG. 1. The C-clamp 14 engages the top surface of the support tab 50 and firmly mounts it on the support 12 as illustrated.

Figure 3:
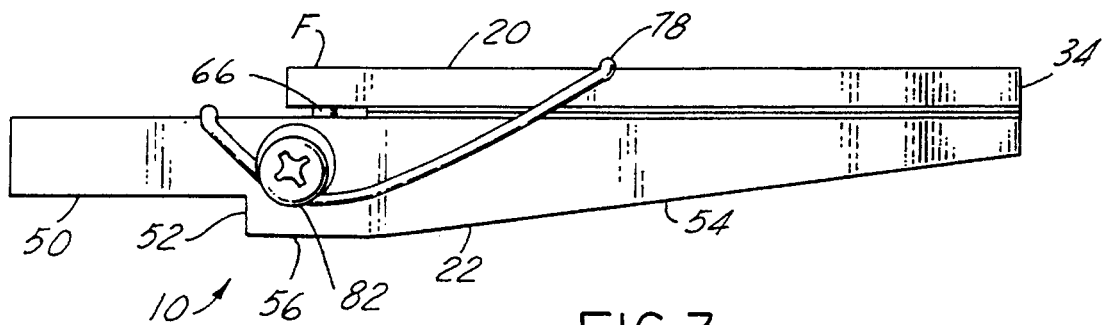
FIG. 3 is a side elevational view of the jeweler's saw vise taken along the line 3—3 of FIG. 2.
Figure 4:
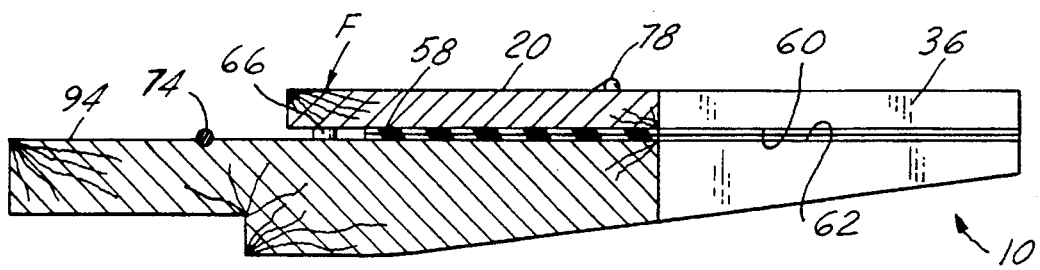
FIG. 4 is a sectional view at the longitudinal centerline of the vise taken along the line 4—4 of FIG. 2.

The lower jaw 22 at the entrance surface 34 has a thickness approximately equal to the thickness of the upper jaw 34. The thickness of the lower jaw 22 increases from the front surface 34 towards the rear. Thus the jaw 22 has a tapered or inclined lower surface 54 as best shown in FIGS. 3 and 4. The tapered surface 54 flattens out at surface 56.

Jaws 20 and 22 have opposing inner surfaces 60 and 62. A pair of resilient inserts 58 are connected to surfaces 60 and 62 to provide a resilient cover for the jaws 20 and 22. The inserts 58 are made from rubber and are provided with a V-shaped notch which conforms to the notch 36 provided in jaws 20 and 22. The rubber inserts 58 grip the workpiece W.

The top jaw 20 is provided with a pair of openings 64 which receive corresponding alignment pin 66. The alignment pins 66 are fixedly carried by the lower jaw 22. The purpose of the alignment or indexing pins 66 is to permit the jaws to self adjust to various thickness of materials. The pins 66 move vertically in the holes 64 provided in the top plate 20.

A person can apply a force F to the rear end of the upper law 20 and result in a slight opening of the jaws 20 and 22 at the entrance 34.

An integral biasing spring 70 is provided. It includes a pair of generally parallel and spaced apart arms 72, a bridge member 74 connected to the arms 72 via a pair of eyelets 76 which are located at opposite sides of the spring 70. The spring 70 further includes a pair of ends or end portions 78 which are pointed towards one another and extend into openings 80 provided in the upper jaw 20 for anchoring purposes.

A pair of screws or fasteners 82 having enlarged heads 84 extend through the eyelets 76 and secure the spring 70 to opposite sides of the lower jaw 22. When mounted in the manner just described the arms 72 of the spring 70 are inclined as shown in FIG. 3 and extend parallel with the sides of the lower jaw. The bridge member 74 extends across and is received within a slot or groove 90 provided in the top surface 94 of the mounting tab 50. The ends 78 engage the top surface of the upper jaw 20 and the ends thereof are anchored in the holes 64 provided therein.

When the jeweler's saw vise 10 is mounted on a support 12 as shown in FIG. 1 the craftsman may take hold of the finger grip 32 with his left hand and separate the jaws 20 and 22 so as to insert the workpiece W between the jaws. Thereafter the craftsman operates the saw 24 to form the appropriate cut or cuts in the workpiece W. As noted the sawing is done within the confines of the V-shaped notch 36. The workpiece W can easily be turned by opening the vice 10 by the mechanic or craftsman, taking hold of the finger grip 32 and separating the jaws 20 and 22 thereby opening the vise 10 and thereafter replacing the workpiece W or the material in different positions in the vise without removing the saw 24 from the workpiece W being sawed.

The present invention is a perfect tool for holding metal, wood, plastic or cardboard for easy sawing. It can be used by jewelers, hobbiests, or craftpersons. The present invention is an improvement over the prior art device since the hands are not as likely to fatigue. In addition fewer saw blades are broken. The vise is designed to grip metal having gages from 32 to 4 for easy cutting of the material. Material may be quickly removed from the vise by releasing the jaws. The jaws are self adjusting, the workpiece may be finished rapidly and with ease by the craftsperson.

What is claimed is:

1. A jeweler's saw vise for holding a relatively thin workpiece to permit a jeweler to use a saw to cut the workpiece firmly held by the vise comprising a pair of elongated upper and lower jaws having front and rear end portions, with said front portion having a front surface, with said upper jaw being superimposed over said lower jaw, said jaws at said front end portion having a V-notch therein extending rearwardly from said front surface, and with the widest part of said V-notch being located in said front surface to form an entrance to said vice, said lower jaw being longer than said upper jaw and forming at said rear end portion a mounting tab for attaching the vise to a support, a biasing spring interposed between said jaws to resiliently bias the jaws closed; said biasing spring having a pair of generally parallel spaced apart arms which are connected by a laterally extending bridge member, with the ends of said biasing spring bent inwardly towards one another; and means mounting the arms of said biasing spring to said lower jaw, with said bridge member engaging the upper surface of and extending across said tab and with said ends extending across and being secured to said upper jaw.

2. The jeweler's saw vise as defined in claim 1, wherein the opposing surfaces of said upper and lower jaws are provided with relatively thin resilient inserts which extend from the front surface of the jaws towards the rear, said resilient inserts having a V-notch therein to match the V-notch provided in said jaws.

3. A jeweler's saw vise for holding a relatively thin workpiece to permit a jeweler to use a saw to cut the workpiece firmly held by the vise comprising a pair of elongated upper and lower jaws having front and rear end portions, with said front portion having a front surface, with said upper jaw being superimposed over said lower jaw, said jaws at said front end portion having a V-notch therein extending rearwardly from said front surface, and with the widest part of said V-notch being located in said front surface to form an entrance to said vise, said lower jaw being longer than said upper jaw and forming at said rear end portion a mounting tab for attaching the vise to a support, a biasing spring interposed between said jaws to resiliently bias the jaws closed; said upper jaw having a pair of longitudinal parallel edges, and is provided with a finger grip along one of the longitudinal edges of said upper jaw opposite said V-notch to permit the jeweler to separate the jaws to insert or to adjust the workpiece.

4. A jeweler's saw vise as defined in claim 3, wherein said finger grip is located at the left side of the upper jaw to accommodate a jeweler using the right hand to hold the saw and to cut the workpiece.

5. A jeweler's saw vise for holding a relatively thin workpiece to permit a jeweler to use a saw to cut the workpiece firmly held by the vise comprising a pair of elongated upper and lower jaws having front and rear end portions, with said front portion having a front surface, with said upper jaw being superimposed over said lower jaw, said jaws at said front end portion having a V-notch therein extending rearwardly from said front surface, and with the widest part of said V-notch being located in said front surface to form an entrance to said vise, said lower jaw being longer than said upper jaw and forming at said rear end portion a mounting tab for attaching the vise to a support, a biasing spring interposed between said jaws to resiliently bias the jaws closed; and a pair of alignment pins are provided between the jaws to allow the jaws to self adjust to various thickness of the workpiece.

6. The jeweler's saw vise as defined in claim 1, wherein said upper and lower jaws are made from wood, said jaw inserts are made from rubber and said spring is made from metal.

7. A jeweler's saw vise as defined in claim 1, wherein said upper jaw has a uniform thickness throughout its length.

8. A jeweler's saw vise for holding a relatively thin workpiece to permit a jeweler to use a saw to cut the workpiece firmly held by the vise comprising a pair of elongated upper and lower jaws having front and rear end portions, with said front portion having a front surface, with said upper jaw being superimposed over said lower jaw, said jaws at said front end portion having a V-notch therein extending rearwardly from said front surface, and with the widest part of said V-notch being located in said front surface to form an entrance to said vise, said lower jaw being longer than said upper jaw and forming at said rear end portion a mounting tab for attaching the vise to a support, a biasing spring interposed between said jaws to resiliently bias the jaws closed; said mounting tab is of generally rectangular configuration, with the remaining portion of said lower jaw having the lower surface thereof tapered with the thinnest part being at the front surface of the lower jaw and the thickest part being adjacent the rear-end portion of the lower jaw at the place where the mounting tab is formed.

9. A jeweler's saw vise as defined in claim 1, wherein the vise is mounted on a table or desk with a conventional C-clamp.

10. A jeweler's saw vise as defined in claim 1, wherein the workpiece is placed between the jaws which open easily against the bias of the spring after the vise has been properly mounted.

11. The jeweler's saw vise as defined in claim 1, wherein said upper and lower jaws are made from aluminum, said jaw inserts are made from rubber and said spring is made from metal.

* * * * *